(12) United States Patent
Liu et al.

(10) Patent No.: US 7,213,923 B2
(45) Date of Patent: May 8, 2007

(54) EMISSION OF VISIBLE LIGHT IN RESPONSE TO ABSORPTION OF EXCITATION LIGHT

(75) Inventors: Jian-Qiang Liu, Campbell, CA (US); Xiao-Dong Sun, Fremont, CA (US)

(73) Assignee: Superimaging, Inc., Fremont, CA (US)

( * ) Notice: Subject to any disclaimer, the term of this patent is extended or adjusted under 35 U.S.C. 154(b) by 68 days.

(21) Appl. No.: 11/107,204

(22) Filed: Apr. 15, 2005

(65) Prior Publication Data

US 2005/0231652 A1    Oct. 20, 2005

Related U.S. Application Data

(60) Provisional application No. 60/563,376, filed on Apr. 19, 2004.

(51) Int. Cl.
*G03B 21/14* (2006.01)

(52) U.S. Cl. .................. 353/31; 353/79; 359/452
(58) Field of Classification Search ............. 353/31, 353/34, 37, 11, 12, 79, 122; 359/443–461
See application file for complete search history.

(56) References Cited

U.S. PATENT DOCUMENTS

| | | |
|---|---|---|
| 3,598,995 A | 8/1971 | Inoue et al. |
| 3,881,800 A | 5/1975 | Friesem |
| 3,953,117 A | 4/1976 | Cannon |
| 4,158,210 A | 6/1979 | Watanabe et al. |
| 4,689,522 A | 8/1987 | Robertson |
| 4,713,577 A | 12/1987 | Gualtieri et al. |
| 4,814,666 A | 3/1989 | Iwasaki et al. |
| 4,960,314 A | 10/1990 | Smith et al. |
| 4,989,956 A | 2/1991 | Wu et al. |
| 5,045,706 A | 9/1991 | Tanaka et al. |
| 5,078,462 A | 1/1992 | Gravisse |
| 5,142,387 A | 8/1992 | Shikama et al. |
| 5,162,160 A | 11/1992 | Matsui et al. |
| 5,233,197 A | 8/1993 | Bowman et al. |
| 5,289,315 A | 2/1994 | Makita et al. |
| 5,347,644 A | 9/1994 | Sedlmayr |

(Continued)

FOREIGN PATENT DOCUMENTS

JP    4281422    10/1992

OTHER PUBLICATIONS

Murray, "Head-up displays get second glance", EE Times, Jan. 5, 2004.

(Continued)

*Primary Examiner*—William C. Dowling
(74) *Attorney, Agent, or Firm*—Sherr & Nourse, PLLC

(57) ABSTRACT

In accordance with embodiments, viewable images can be created in glass. Viewable images may be created in glass by using a projector which projects ultraviolet light to excite light emitting material. Clear images may be created in glass because the size the light emitting particles in the glass is less than 400 nanometers. In embodiments, the visible illumination of a transparent substrate to display an image is possible, while the transparent substrate remains transparent. Accordingly, for example, drivers of automobiles may view images (e.g. map images) on their windshield while they are driving. As another example, window shoppers may view enhanced advertisements in the windows of stores that they are approaching.

40 Claims, 17 Drawing Sheets

U.S. PATENT DOCUMENTS

| | | | |
|---|---|---|---|
| 5,424,535 A | 6/1995 | Albion et al. |
| 5,473,396 A | 12/1995 | Okajima et al. |
| 5,566,025 A | 10/1996 | Knoll et al. |
| 5,646,479 A | 7/1997 | Troxell |
| 5,684,621 A | 11/1997 | Downing |
| 5,764,403 A | 6/1998 | Downing |
| 5,784,162 A | 7/1998 | Cabib et al. |
| 5,786,582 A | 7/1998 | Roustaei et al. |
| 5,914,807 A | 6/1999 | Downing |
| 5,921,650 A | 7/1999 | Doany et al. |
| 5,943,160 A | 8/1999 | Downing |
| 5,956,172 A | 9/1999 | Downing |
| 5,957,560 A | 9/1999 | Do et al. |
| 6,064,521 A | 5/2000 | Burke |
| 6,128,131 A | 10/2000 | Tang |
| 6,166,852 A | 12/2000 | Miro |
| 6,221,112 B1 | 4/2001 | Snider |
| 6,239,907 B1 | 5/2001 | Allen et al. |
| 6,261,402 B1 | 7/2001 | Watanabe et al. |
| 6,327,074 B1 | 12/2001 | Bass et al. |
| 6,337,769 B1 | 1/2002 | Lee |
| 6,381,068 B1 | 4/2002 | Harada et al. |
| 6,439,888 B1 | 8/2002 | Boutoussov et al. |
| 6,466,184 B1 | 10/2002 | Whitesell et al. |
| 6,501,590 B2 | 12/2002 | Bass et al. |
| 6,507,436 B2 | 1/2003 | Nishikawa et al. |
| 6,654,161 B2 | 11/2003 | Bass et al. |
| 6,769,773 B1 | 8/2004 | Wu |
| 6,804,053 B2 | 10/2004 | Etori et al. |
| 6,809,781 B2 | 10/2004 | Setlur et al. |
| 6,844,950 B2 | 1/2005 | Ja Chisholm et al. |
| 6,870,671 B2 | 3/2005 | Travis |
| 6,897,999 B1 | 5/2005 | Bass et al. |
| 2001/0005282 A1 | 6/2001 | Etori et al. |
| 2002/0024495 A1 | 2/2002 | Lippert et al. |
| 2002/0048058 A1 | 4/2002 | Nishikawa et al. |
| 2002/0080482 A1 | 6/2002 | Watanabe et al. |
| 2002/0088925 A1 | 7/2002 | Nestrorovic et al. |
| 2002/0120916 A1 | 8/2002 | Snider, Jr. |
| 2002/0140338 A1 | 10/2002 | Sluzky |
| 2002/0190224 A1 | 12/2002 | Tazaki |
| 2003/0002153 A1 | 1/2003 | Hiraishi et al. |
| 2003/0198456 A1 | 10/2003 | Steiner et al. |
| 2003/0213967 A1 | 11/2003 | Forrest et al. |
| 2003/0214724 A1 | 11/2003 | Fujikawa et al. |
| 2003/0227004 A1 | 12/2003 | Dopps |
| 2004/0022071 A1 | 2/2004 | Cheng et al. |
| 2004/0041988 A1 | 3/2004 | Kitamura |
| 2004/0070551 A1 | 4/2004 | Walck et al. |
| 2004/0070824 A1 | 4/2004 | Toda et al. |
| 2004/0090794 A1 | 5/2004 | Ollett et al. |
| 2004/0100692 A1 | 5/2004 | Hou |
| 2004/0114219 A1 | 6/2004 | Richardson |
| 2004/0135976 A1 | 7/2004 | Ishihara et al. |
| 2004/0149998 A1 | 8/2004 | Henson et al. |
| 2004/0164669 A1 | 8/2004 | Kawaguchi et al. |
| 2004/0224154 A1 | 11/2004 | Toda et al. |
| 2004/0233526 A1 | 11/2004 | Kaminsky et al. |
| 2004/0257650 A1 | 12/2004 | Parusel et al. |
| 2005/0030617 A1 | 2/2005 | Umeya |
| 2005/0063054 A1 | 3/2005 | Umeya |
| 2005/0088736 A1 | 4/2005 | Ghozell et al. |
| 2005/0088737 A1* | 4/2005 | Piehl ..................... 359/443 |
| 2005/0152032 A1 | 7/2005 | Olofson et al. |
| 2005/0174635 A1 | 8/2005 | Bruegl et al. |

OTHER PUBLICATIONS

E-Window Product Web Page. www.nano-proprietary.com.
Rockwell Collins Product Web Page. www.rockwellcollins.com.
Steigerwald et al., "Illumination With Solid State Lighting Technology", IEEE Journal on Selected Topics in Quantum Electronics, Mar. 2002, vol. 8, No. 2.
Jeon et al. "A novel famrication method for a 64 × 64 matrix-addressable GaN-based micro-LED array", Phys. Stat. Sol. (a) 200, No. 1, pp. 79-82 (2003).
Hawkyard, "The release of disperse dyes during thermal processing" Journal of the society of dyes and colourists, vol. 97 (1981) 213-219.
ProScreenInc Product Web Page. www. proscreeninc.com.
Web Page from www.smartmotorist.com.
Iwaya, et al., "High Power UV-Light-Emitting Diode on Sapphire", Jpn. J. Appl. Phys. vol. 42(2003) pp. 400-403.
Coosemans et al., "MT-compatible . . . datalinks", Materials Science In Semiconductor Processing, vol. 3 (2000) pp. 475-480.
"Handbook of Plastics, Elastomers, and Composites" Harper, C. McGraw-Hill, 3rd Ed (1996).
Xiao-Dong (Ted) Sun, etc. Identification and optimization of advanced phosphors using combinational libraries Appl. Phys. Lett., vol. 70, No. 25, Jun. 23, 1997.
"A Three- Color, Solid- State, Three Dimensional Display", E. Downing et al, Science vol. 273, pp. 1185-1189, 1996.
J. Lewis et al., IEEE Trans Election Devices vol. 18 pp. 724, 1971.

* cited by examiner

EMISSION OF VISIBLE LIGHT IN RESPONSE TO ABSORPTION OF EXCITATION LIGHT

Priority is claimed to U.S. Provisional Patent Application No. 60/563,376, filed in the U.S. Patent and Trademark Office on Apr. 19, 2004.

BACKGROUND

The reproduction of images has had a positive effect on many people's lives. One of the earliest technologies for reproducing images was the movie projector, which allowed for audiences to view theatrical productions without live actors and actresses. Televisions were invented, which allowed people to watch moving pictures in the comfort of their own homes. The first televisions were cathode ray tube (CRT) televisions, which is a technology that is still being used today. During the computer age, it has been desirable to reproduce images which are output from computers through monitors. Like many televisions, many computer monitors use CRT technology.

Other technologies have been developed as substitutes for CRT technology. For example, liquid crystal display (LCD) technology is commonplace for both computer monitors and televisions. A LCD is a relatively thin display, which is convenient for many people. Other examples of displays are plasma displays, rear projections displays, and projectors. As display technology has improved, many new applications are being developed. For example, many attempts have been made to develop displays which create viewable images in glass. However, there have been many technical challenges that have prevented creation of viewable images in glass or other transparent material. Specifically, it has been difficult for glass to be maintained in a substantially transparent state and be able to display viewable images with sufficient illumination and clarity.

SUMMARY

In accordance with embodiments, viewable images can be created in glass. Viewable images may be created in glass by using at least one ultraviolet light source (e.g. a laser and/or projector) to excite light emitting material. Clear images may be created in glass because the size the light emitting particles in the glass is relatively small (e.g. less than 500 nanometers). In embodiments, the visible illumination of a transparent substrate to display an image is possible, while the transparent substrate remains transparent. Accordingly, for example, drivers of automobiles may view images (e.g. map images) on their windshield while they are driving. As another example, window shoppers may view enhanced advertisements in the windows of stores that they are approaching, while the windows remain transparent. In embodiments, different colors may be illuminated on glass by adjusting the wavelength of the ultraviolet light to create color images.

Embodiments relate to an apparatus which includes light emitting material integrated into a substantially transparent substrate. The light emitting material emits visible light in response to absorption of excitation light. The wavelength of the visible light varies according to the wavelength of the excitation light.

Embodiments relate to a method which includes integrating light emitting material into a substantially transparent substrate. The light emitting material is configured to emit visible light in response to absorption of excitation light. The wavelength of the visible light varies according to the wavelength of the excitation light.

DRAWINGS

DESCRIPTION

Figure 1:
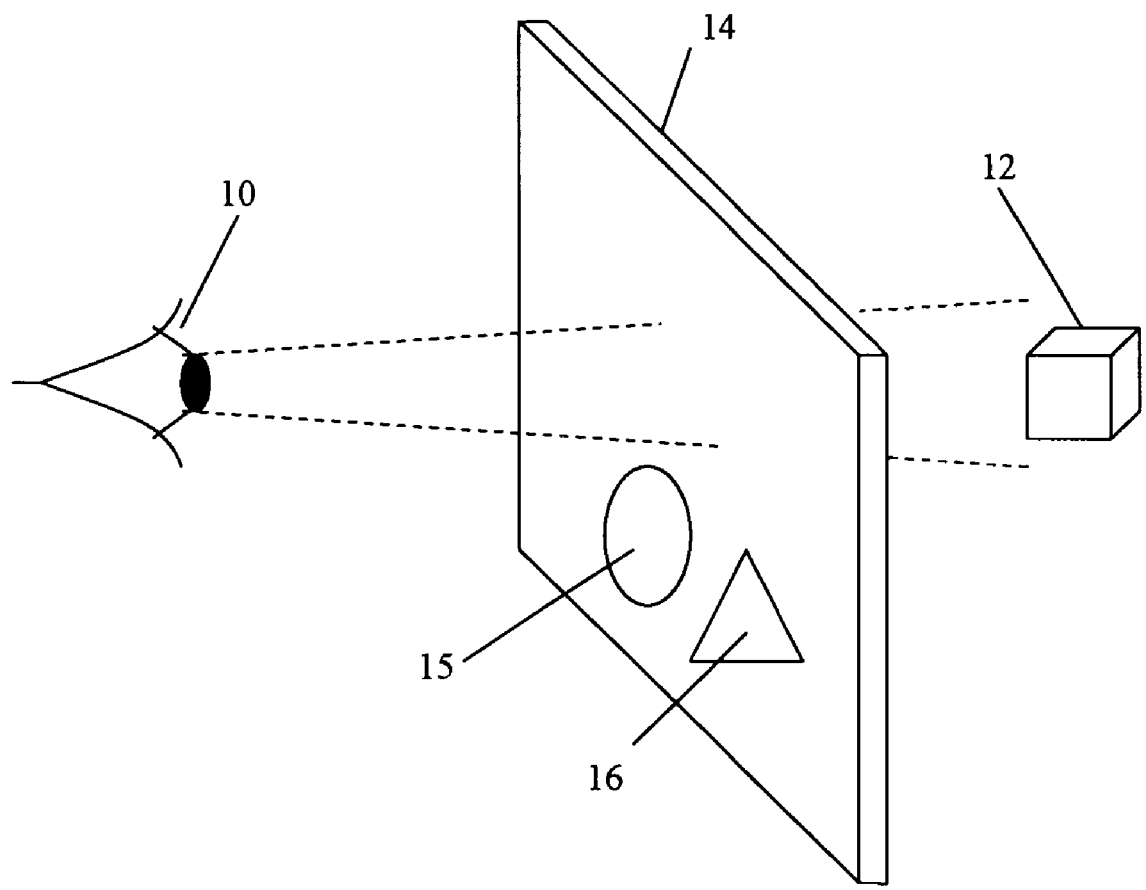
FIG. 1 is an example diagram of a substantially transparent display.

FIG. 1 is an example diagram of a substantially transparent display, in accordance with embodiments. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a building window, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

Figure 2:
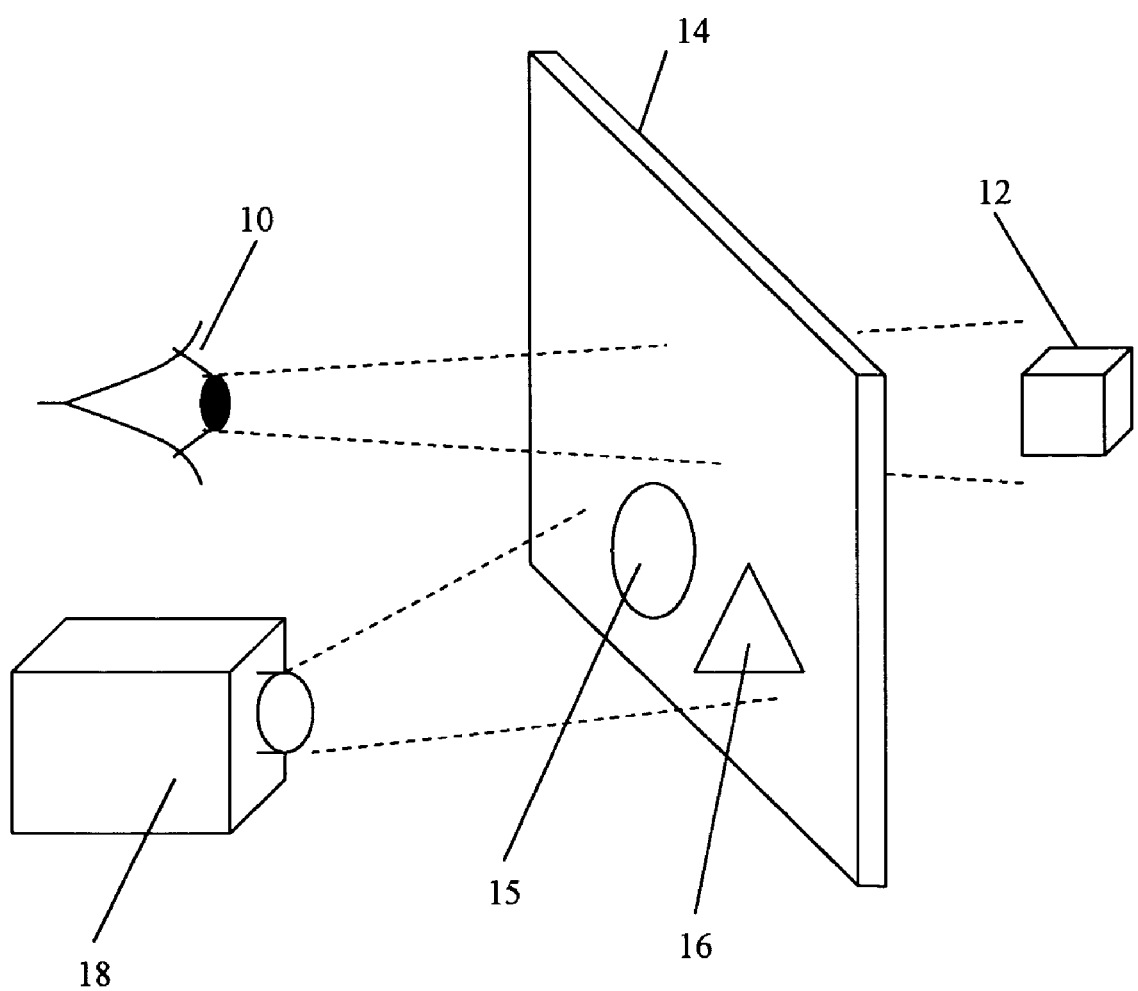
FIG. 2 is an example diagram of a transparent display illuminated with excitation light from a projector.
Figure 3:
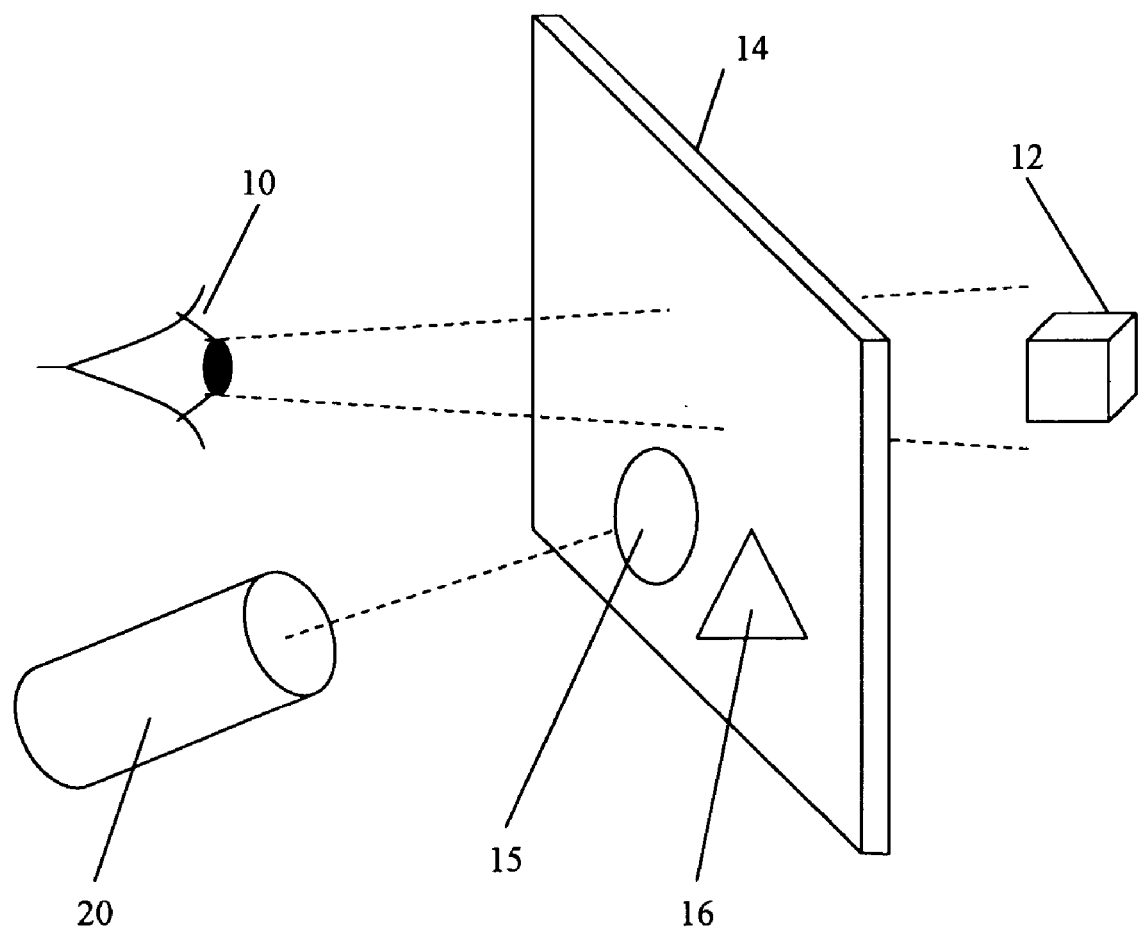
FIG. 3 is an example diagram of a transparent display illuminated with excitation light from a laser.

FIGS. 2 and 3 are example diagrams of transparent displays illuminated with excitation light (e.g. ultraviolet light or infrared light) from light sources (e.g. projector 18 or laser 20), in accordance with embodiments. Substrate 14 may receive excitation light from a light source (e.g. projector 18 or laser 20). The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

The excitation light may be ultraviolet light, in accordance with embodiments of the present invention. If the excitation light is ultraviolet light, then when the light emitting material emits visible light in response to the ultraviolet light, a down-conversion physical phenomenon occurs. Specifically, ultraviolet light has a shorter wavelength and higher energy than visible light. Accordingly, when the light emitting material absorbs the ultraviolet light and emits lower energy visible light, the ultraviolet light is down-converted to visible light because the ultraviolet light's energy level goes down when it is converted into visible light. In embodiments, the light emitting material is fluorescent material.

The excitation light may be infrared light, in accordance with embodiments of the present invention. If the excitation light is infrared light, then when the light emitting material emits visible light in response to the infrared light, an up-conversion physical phenomenon occurs. Specifically, infrared light has a longer wavelength and lower energy than visible light. Accordingly, when the light emitting material absorbs the infrared light and emits higher energy visible light, the infrared light is up-converted to visible light because the infrared light's energy level goes up when it is converted into visible light. In embodiments, the light emitting material is fluorescent material. In the up-conversion physical phenomenon, absorption of more than one infrared light photon may be necessary for the emission of every visible light photon.

In embodiments illustrated in FIG. 2, the excitation light is output by projector 18. Projector 18 may be a digital projector. In embodiments, projector 18 is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the projector 18 is a liquid crystal display (LCD) projector. In embodiments, the projector may be a liquid crystal on silicon (LCOS) projector. In embodiments, the projector may be an analog projector (e.g. a slide film projector or a movie film projector). One of ordinary skill in the art would appreciate other types of projectors which may be used to project ultraviolet light on substrate 14.

In embodiments illustrated in FIG. 3, excitation light is output from laser 20. The intensity and/or movement of a laser beam output from laser 20 may be modulated to create an image in substrate 14. In down-conversion embodiments, the output from laser 20 may be ultraviolet light. In up-conversion embodiments, the output from laser 20 may be infrared light.

More than one projector or laser may be utilized for illumination. For example, a first projector may be used for excitation of light emitting material which emits a first color and a second projector may be used for excitation of light emitting material which emits a second color. Use of more than one projector may increase the amount of excitation light which is absorbed by the light emitting material. By increasing the amount of excitation light absorbed, the amount of visible light emitted from the light emitting material may be increased. The greater the amount of visible light emitted, the brighter the display. In embodiments, a first projector may be designated for causing emission of red light, a second projector may be designated for causing emission of green light, and a third projector may be designated for causing emission of blue light. However, other configurations can be appreciated. For example, use of two projectors, four projectors, projectors which cause emission of primary colors, projectors which cause the emission of non-primary colors, and substituting lasers for projectors in similar configurations are appreciated.

Figure 4:
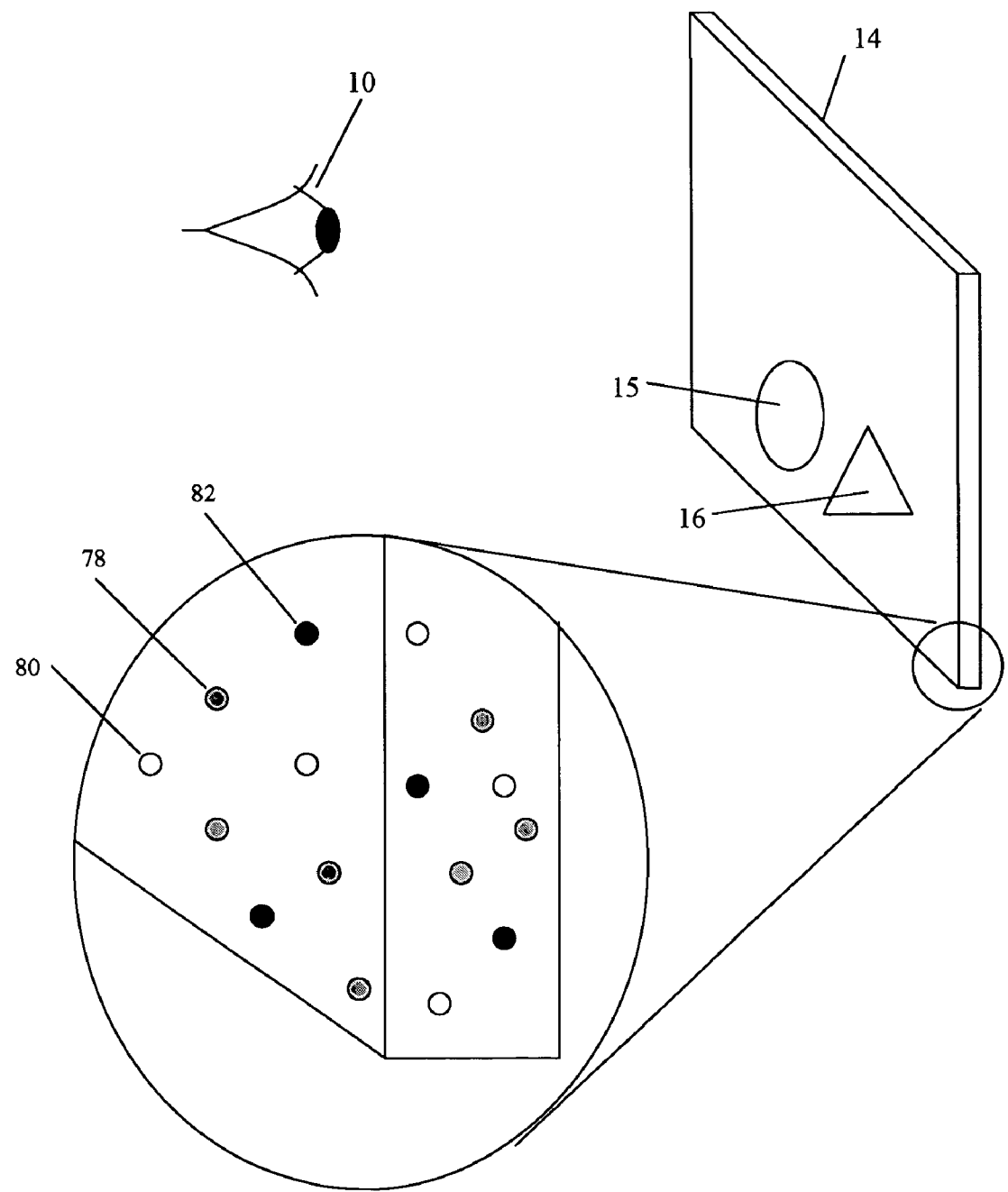
FIG. 4 is an example diagram of light emitting particles dispersed in a substantially transparent substrate.

FIG. 4 is an example diagram of light emitting material (e.g. light emitting materials 78, 80, and/or 82) dispersed in a substantially transparent substrate, according to embodiments. When excitation light is absorbed by the light emitting materials 78, 80, and/or 82), the light emitting materials emit visible light. Accordingly, in down-conversion embodiments, when ultraviolet light is absorbed by light emitting materials 78, 80, and/or 82, visible light is emitted from the light emitting materials. Likewise, in up-conversion embodiments, when infrared light is absorbed by light emitting materials 78, 80, and/or 82, visible light is emitted from the light emitting materials. In embodiments, each of light emitting materials 78, 80, and/or 82 may be a different type of light emitting material, which emits a different range of wavelengths of visible light in response to a different range of wavelengths of excitation light (e.g. ultraviolet or infrared light).

Figure 5:
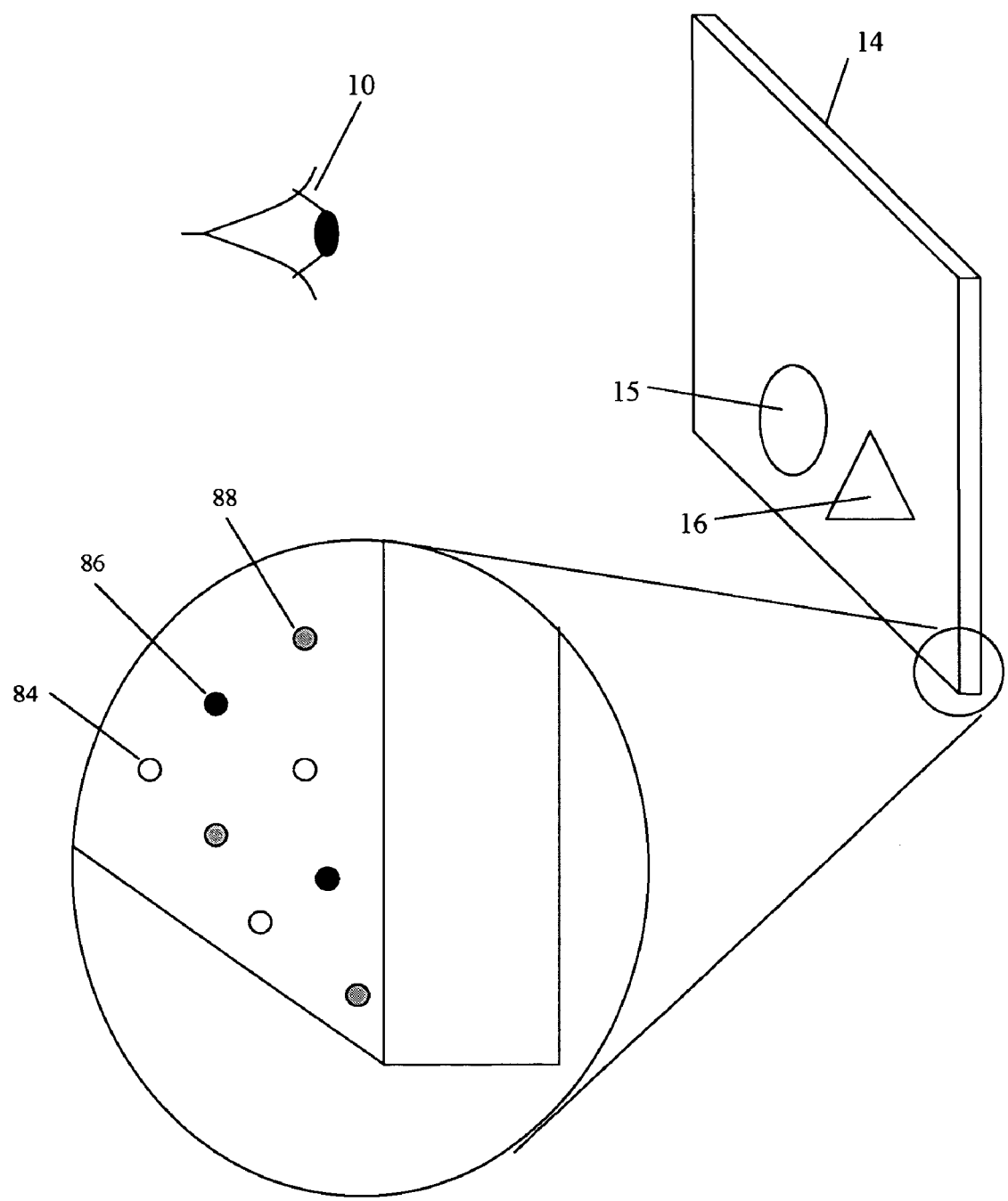
FIG. 5 is an example diagram of light emitting particles disposed on a surface of a substantially transparent substrate.

FIG. 5 is an example diagram of light emitting materials 84, 86, and 88 disposed on a surface of substrate 14. Light emitting materials 84, 86, and 88 may be integrated into substrate 14 by being coated on substrate 14. Other methods can be appreciated for integrating light emitting materials 84, 86, and/or 88 on a surface of substrate 14. Similar to embodiments illustrated in example FIG. 5, each of light emitting materials 84, 86, and/or 88 may be a different type of light emitting material, which emit a different range of wavelengths of visible light in response to a different range of wavelengths of excitation light (e.g. ultraviolet or infrared light).

Light emitting material (e.g. light emitting materials 78, 80, 82, 84, 86, and/or 88) may be fluorescent material, which emits visible light in response to absorption of electromagnetic radiation (e.g. visible light, ultraviolet light, or infrared light) that is a different wavelength than the emitted visible light. Light emitting material may include light emitting particles. The size of the particles may be smaller than the wavelength of visible light, which may reduce or eliminate visible light scattering by the particles. Examples of particles that are smaller than the wavelength of visible light are nanoparticles, individual molecules, and individual atoms. According to embodiments, each of the light emitting particles has a diameter that is less than about 400 nanometers. According to embodiments, each of the light emitting particles has a diameter that is less than about 300 nanometer. According to embodiments, each of the light emitting particles has a diameter that is less than about 200 nanometers. According to embodiments, each of the light emitting particles has a diameter that is less than about 100 nanometers. According to embodiments, each of the light emitting particles has a diameter that is less than about 50 nanometers. The light emitting particles may be individual molecules or individual atoms.

Different types of light emitting particles (e.g. light emitting materials 78, 80, 82, 84, 86, and/or 88) may be used together that have different physical characteristics. For example, in order to create color images in substrate 14, different types of light emitting particles may be utilized that are associated with different colors. For example, a first type of light emitting particles may be associated with the color red, a second type of light emitting particles may be associated with the color green, and a third type of light emitting particles may be associated with the color blue. Although the example first type, second type, and third type of light emitting particles are primary colors, one of ordinary skill in the art would appreciate other combinations of colors (e.g. types of colors and number of colors) in order to facilitate a color display.

In down-conversion embodiments, light emitting particles which emit red light may include Europium, light emitting particles which emit green light may include Terbium, and/or light emitting particles which emit blue or yellow light may include Cerium (and/or Thulium). In embodiments, light emitting particles which emit blue light may include Erbium. In embodiments, light emitting materials which emit blue light may include an organic fluorescent dye.

In up-conversion embodiments, light emitting particles which emit red light may include Praseodymium, light emitting particles which emit green light may include Erbium, and light emitting particles which emit blue light may include Thulium. In embodiments, light emitting particles are fluorescent molecules that emit different colors (e.g. red, green, and blue). In embodiments, light emitting particles are included in pure organic or organo-metallic dyes.

Different types of light emitting particles may absorb different ranges of excitation light to emit the different colors. Accordingly, the wavelength range of the excitation light may be modulated to control the visible color emitted from the light emitting particles in substrate 14. In embodiments, different types of light emitting particles may be mixed together and integrated into substrate 14. By modulating the wavelength of the excitation light, visible light with specific color characteristics can be created in substrate 14. For example, by selectively exciting specific combinations of different types of light emitting particles associated with primary colors, virtually any visible color can be emitted from substrate 14.

In MMA projector embodiments, the wavelength of ultraviolet light emitted from a MMA projector can be modulated using a color wheel with specific ultraviolet pass filters. Similar modulation techniques may be utilized in other projector embodiments and laser embodiments. In embodiments, multiple projectors and multiple lasers may be utilized, each being associated with a specific ultraviolet wavelength range to excite a specific type of light emitting particle, to output a specific color of light.

Figure 6:
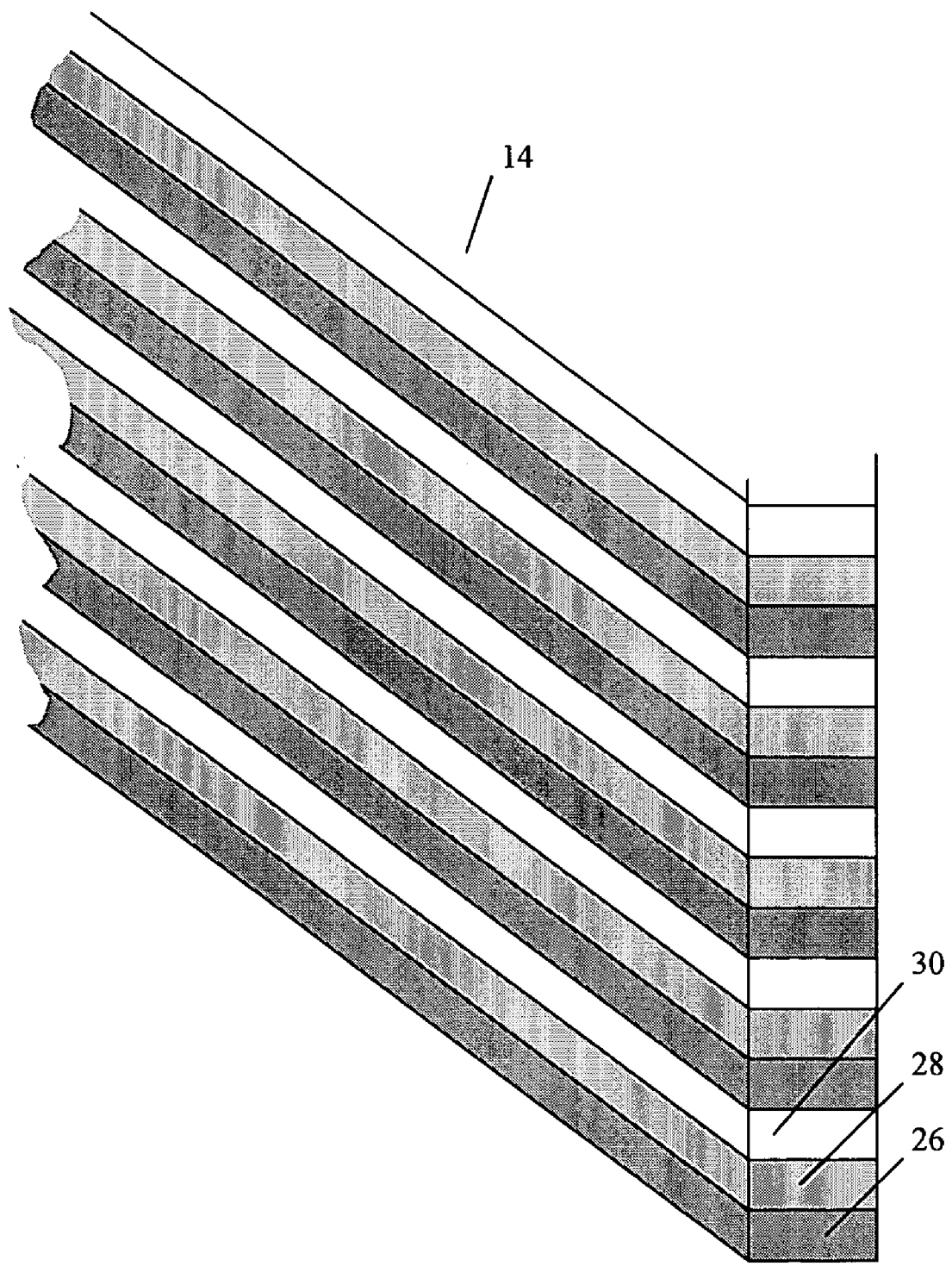
FIG. 6 is an example diagram of different types of light emitting particles, associated with different visible colors, dispersed in different stripe regions in a substantially transparent substrate.

FIG. 6 is an example diagram of different types of light emitting particles, associated with different visible colors, dispersed in different pixel regions (e.g. stripe region 26, stripe region 28, and stripe region 30) in a substantially transparent substrate. In embodiments, substrate 14 may include different regions in which different types of light emitting particle are dispersed. For example, a first type of light emitting particle (e.g. a light emitting particle associated with red light) may be dispersed in stripe region 26, a second type of light emitting particle (e.g. a light emitting particle associated with green light) may be dispersed in stripe region 28, and a third type of light emitting particle (e.g. a light emitting particle associated with blue light) may be dispersed in stripe region 30. Stripe region 26, stripe region 28, and stripe region 30 may be formed in stripes (i.e. rows).

A projector or laser (e.g. projector 18 or laser 20) may use an excitation light wavelength range that excites all of the different types of light emitting particles and selectively illuminates different colors by spatial modulation of the excitation light. For example, in example FIG. 6, to emit green visible light in a given region of substrate 14, projector 18 or laser 20 may illuminate a portion of stripe region 28 (e.g. which includes light emitting particles associated with green light). In embodiments that spatially separate the different types of light emitting particles, it is not necessary for the excitation light source to modulate the wavelength of the excitation light to create different colors, because color may be selected by the spatial modulation of the excitation light.

Figure 7:
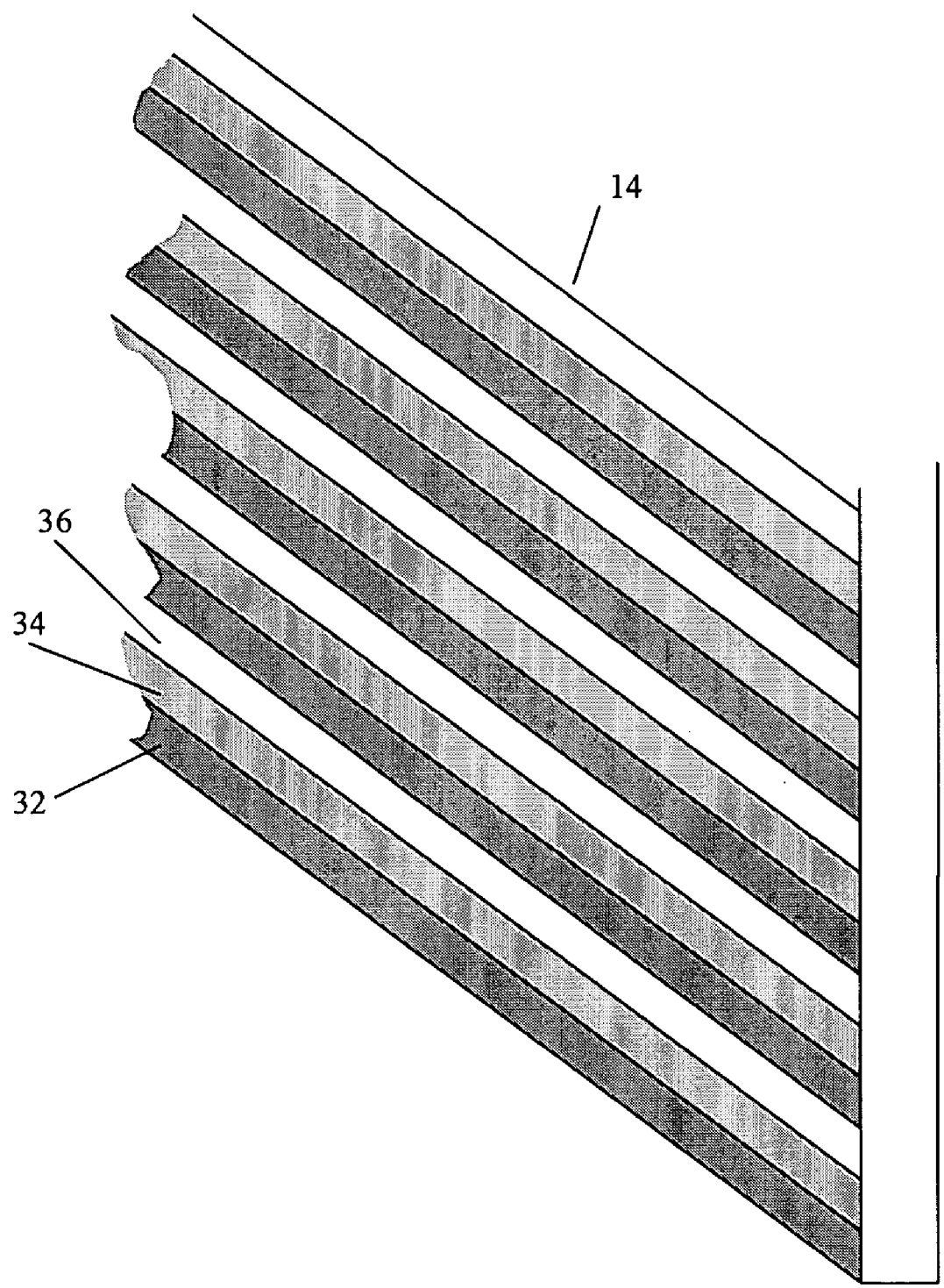
FIG. 7 is an example diagram of different types of light emitting particles, associated with different visible colors, disposed on different stripe regions of a substantially transparent substrate.
Figure 8:
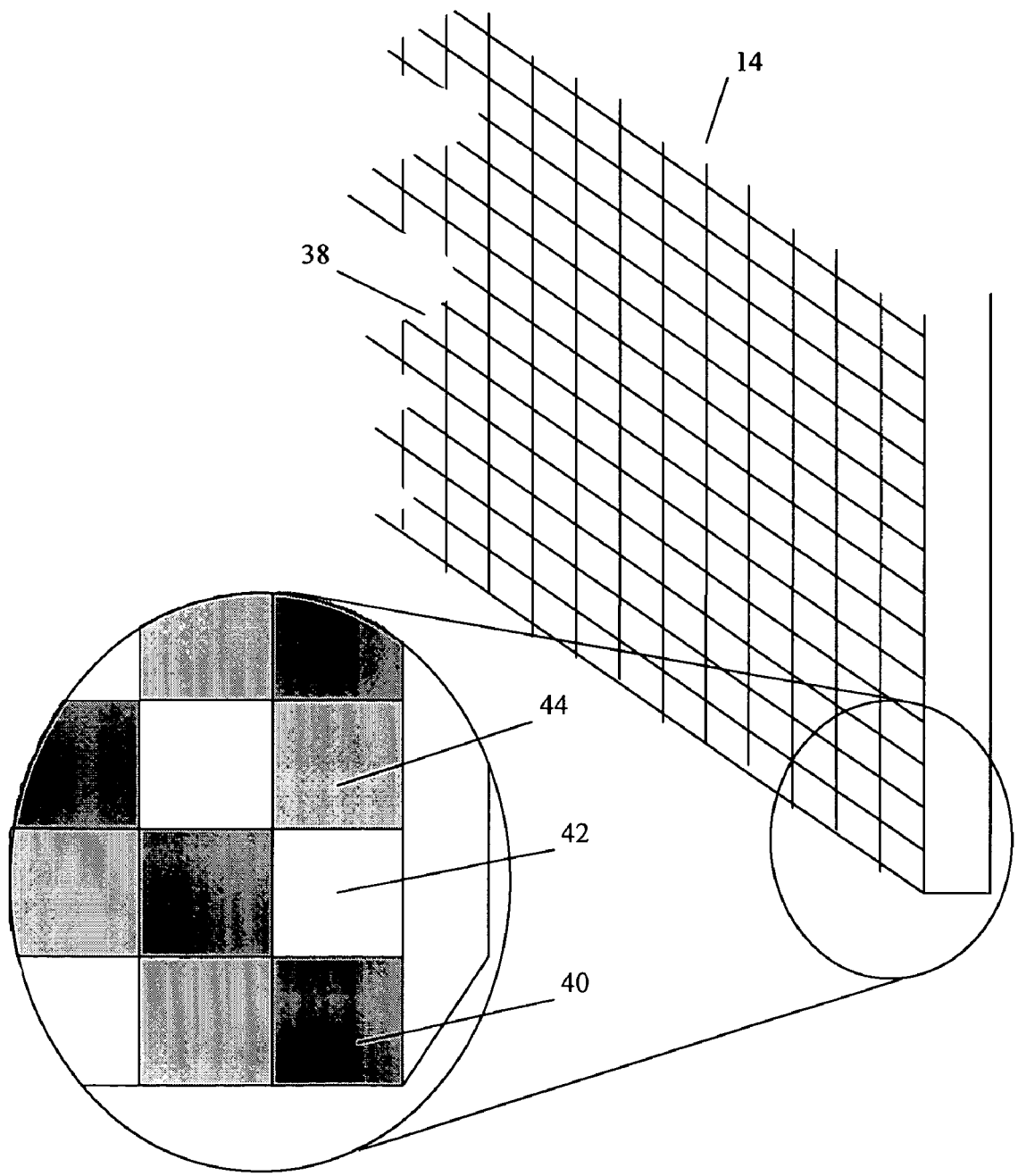
FIG. 8 is an example diagram of different types of light emitting particles, associated with different visible colors, disposed on different matrix regions of a substantially transparent substrate.

Similarly, in embodiments illustrated in FIG. 7, different types of light emitting particles may be coated on regions of substrate 14 (e.g. stripe region 32, stripe region 34, and stripe region 36) instead of being dispersed in substrate 14. In embodiments illustrated in FIG. 8, different types of light emitting particles, associated with different visible colors, are separated into different regions of substrate 14 in the form of a matrix 38. FIG. 8 illustrates different matrix regions (e.g. region 40, region 42, and region 44) that include different types of light excitation particles associated with different colors. One of ordinary skill in the art would appreciate that other pixel configurations are applicable, other than the stripe and pixel configurations illustrated in FIGS. 6–8, without departing from embodiments. Although example FIG. 8 illustrates light emitting particles coated on substrate 14, the light emitting particles may also be dispersed in substrate 14, similar to embodiments illustrated in FIG. 6.

In embodiments, excitation light projected on substrate 14 of FIGS. 6, 7, and 8 can be wavelength modulated to cause emission of different colors. Accordingly, it may not be necessary to spatially modulate the excitation light. When the excitation light projected on substrate 40 (of FIGS. 6, 7, and/or 8) is wavelength modulated, only the regions (e.g. stripes or pixels) which are sensitive to a particular wavelength will be illuminated. In embodiments, excitation light can be both spatially modulated and wavelength modulated.

Figure 9:
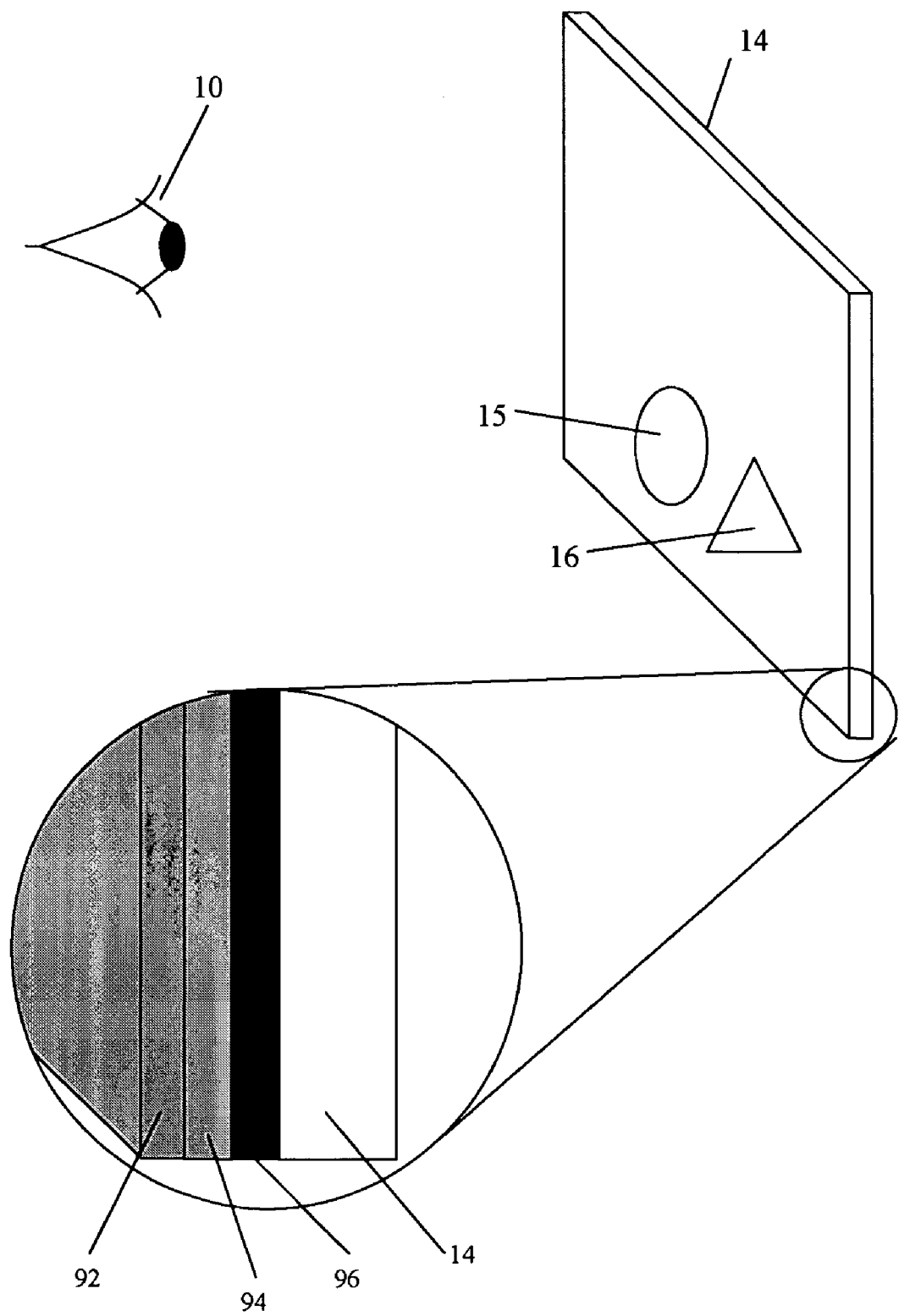
FIG. 9 is an example diagram of different types of light emitting particles, associated with different visible colors, integrated at a substrate as layers.

FIG. 9 illustrates different types of light emitting materials (e.g. light emitting materials 92, 94, and 96) layered on substrate 14, in accordance with embodiments. In embodiments, the light emitting materials 92, 94, 96, are substantially transparent to light, except light with specific wavelength ranges which are absorbed and are different for each of the different light emitting materials 92, 94, and 96. Accordingly, in embodiments, the excitation light projected on substrate 14 does not need to be spatially modulated. Further, the layers may be coated on the substrate with different thicknesses. By coating the different light emitting materials 92, 94, and 96 with different thicknesses, the responsiveness to excitation light of a particular type of material can be controlled. For example, it may be desirable to balance the emission of different primary colors, since different light emitting materials may illuminate the different colors at different intensities from the same amount of absorbed light.

Figure 10:
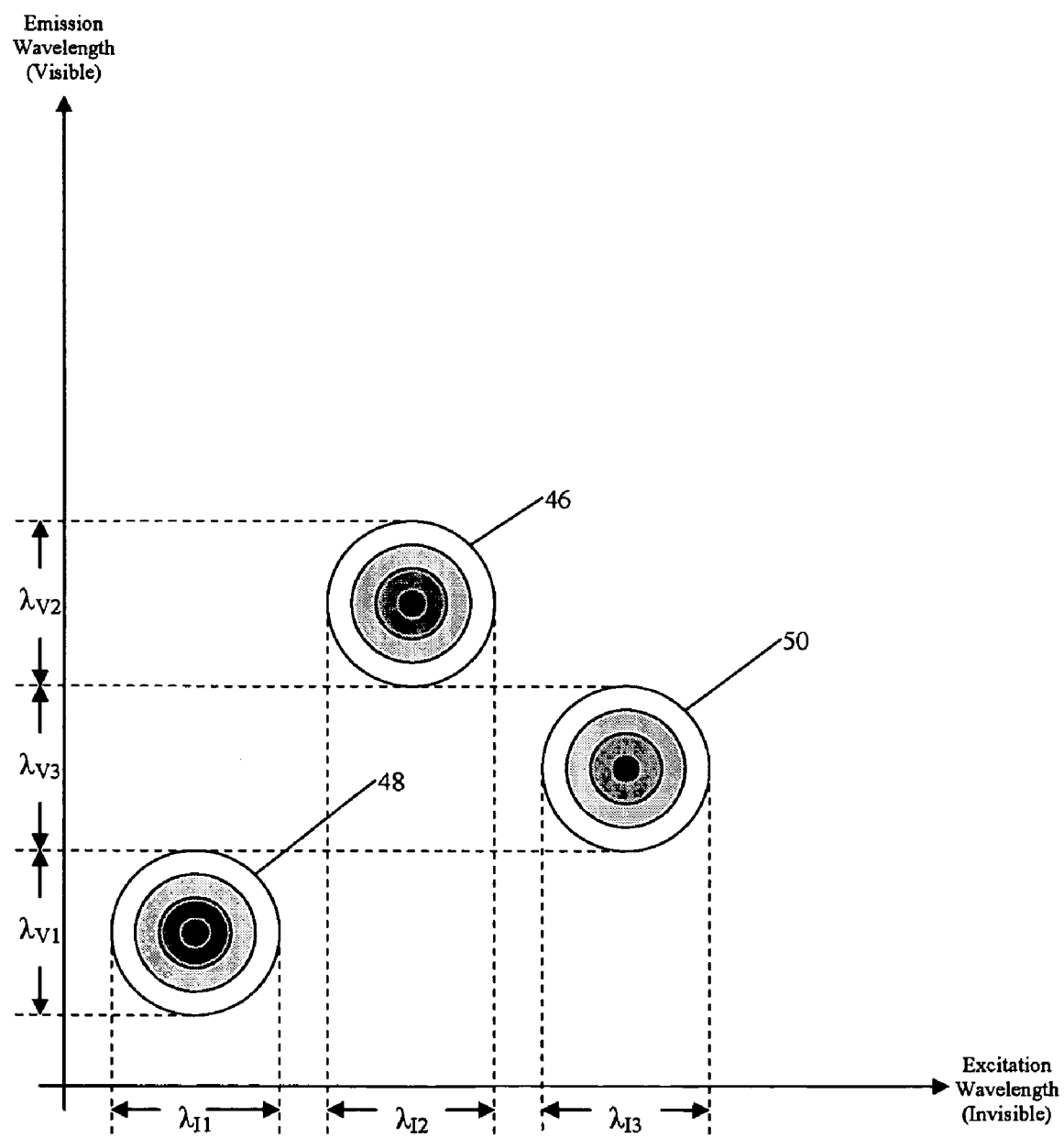
FIGS. 10–17 are example diagrams illustrating the relationship between the wavelengths of light emitted from light emitting material in response to the wavelengths of light absorbed by the light emitting material.

FIG. 10 is an example diagram of the excitation and emission relationships of different light emitting materials. Example region 48 illustrates the excitation/emission cross-section of a first type of light emitting material. Example region 46 illustrates the excitation/emission cross-section of a second type of light emitting material. Example region 50 illustrates the excitation/emission cross-section of a third type of light emitting material.

Each of example regions 48, 46, and 50 include several sub-regions. For illustrative purposes, each of the sub-regions has a different shade. The center sub-regions are the smallest and darkest and are illustrated in the shape of a circle. The other subregions are in the shape of rings and have progressively lighter shades than the center subregion. The center subregions are the most sensitive to the excitation light and the other surrounding subregions are progressively less sensitive to the excitation light, the further they are from the center subregion. One of ordinary skill in the art appreciates that the illustration of the excitation/emission crosssections in the shapes of circles and rings is illustrative and is for example purposes only. The subregions may have other shapes and distributions than the illustrated circles and rings.

For region 48, excitation light with a wavelength range $\lambda_{I1}$ causes emission of light with a wavelength range $\lambda_{V1}$. For example, $\lambda_{I1}$ may be in the range of about 380 nanometers to about 400 nanometers and $\lambda_{V1}$ may be in the range of about 430 nanometers to about 520 nanometers. Emission light in the range of about 430 nanometers and about 520 nanometers has a blue color.

For region 46, excitation light with a wavelength range $\lambda_{I2}$ causes emission of light with a wavelength range $\lambda_{V2}$. For example, $\lambda_{I2}$ may be in the range of about 400 nanometers to about 430 nanometers and $\lambda_{V2}$ may be in the range of about 575 nanometers to about 650 nanometers. Emission light in the range of about 575 nanometers and about 650 nanometers has a red color.

For region 50, excitation light with a wavelength range $\lambda_{I3}$ causes emission of light with a wavelength range $\lambda_{V3}$. For example, $\lambda_{I3}$ may be in the range of about 430 nanometers to about 460 nanometers and $\lambda_{V3}$ may be in the range of about 500 nanometers to about 575 nanometers. Emission light in the range of about 500 nanometers to about 575 nanometers has a green color.

In the distribution of the wavelength ranges $\lambda_{V1}$, $\lambda_{V2}$, and $\lambda_{V3}$, their distributions may be contiguous, overlapping, and/or have some separation. Likewise, in the distribution of the wavelength ranges $\lambda_{I1}$, $\lambda_{I2}$, and $\lambda_{I3}$, their distributions may be contiguous, overlapping, and/or have some separation. In embodiments, as shown in example FIG. 4 there is some separation between each of the wavelength ranges ranges $\lambda_{I1}$, $\lambda_{I2}$, and $\lambda_{I3}$. This separation allows for selective emission of visible light in the wavelength ranges $\lambda_{V1}$, $\lambda_{V2}$, and $\lambda_{V1}$ without interference. In other words, when excitation light in a light wavelength range of $\lambda_{I2}$ is absorbed by light emitting material characterized by region 46, then only light having the wavelength range $\lambda_{V2}$ (e.g. red light) is emitted.

Regions 46, 48, and 50 may characterize primary colors, which can be combined to emit non-primary colors. For example region 48 may characterize blue emission, region 46 may characterize red emission, and/or region 50 may characterize green emission. Excitation light may be absorbed that includes a combination of regions 46, 48, and/or 50 to emit a non-primary color. To emit a non-primary color, different portions of the wavelength ranges $\lambda_{I1}$, $\lambda_{I2}$, and/or $\lambda_{I3}$ may be used to control the contribution of the primary colors to emit a non-primary color. Likewise, exposure time of excitation light in the wavelength ranges $\lambda_{I1}$, $\lambda_{I2}$, and/or $\lambda_{I3}$ may be used to control the contribution of the primary colors to emit a non-primary color. One of ordinary skill in the art would appreciate that primary colors can be color other than red, green, and blue, which may be combined together.

Figure 11:
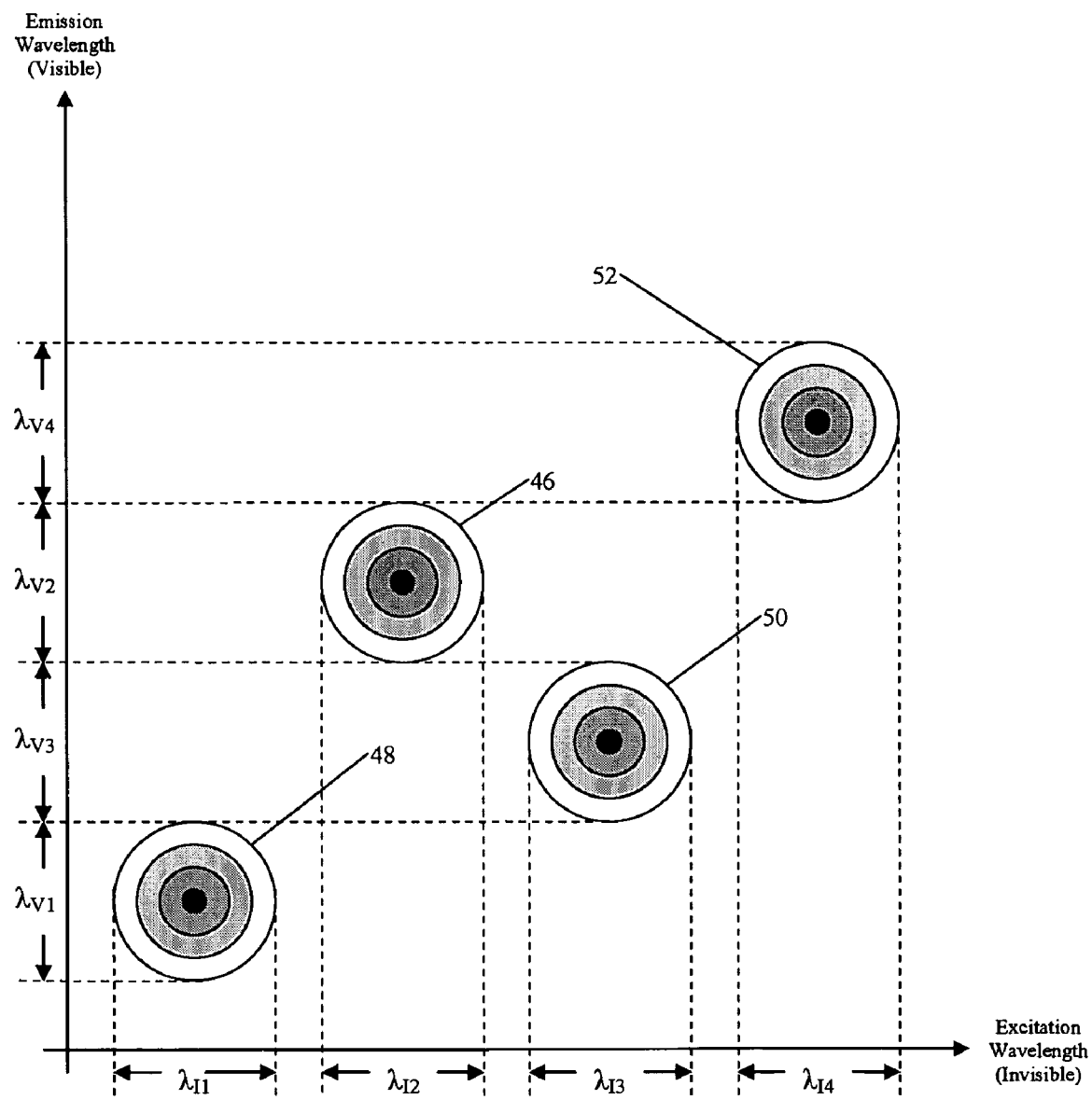

FIG. 11 is an example diagram illustrating that region 52 in addition to regions 48, 46, and 50, in accordance with embodiments. As illustrated, more than three types of light emitting materials can be integrated into a substrate to emit more than three visible colors. In embodiments, any number (e.g. 1, 2, 3, 4, 5, 6, or 345) of types of different light emitting materials can be integrated into a substrate. As illustrated in example FIG. 11, region 52 is the cross-section of excitation wavelength range $\lambda_{I4}$ and emission wavelength range $\lambda_{V4}$. In embodiments, emission wavelength range $\lambda_{V4}$ may be either separated, contiguous, and/or overlapping with emission wavelength ranges $\lambda_{V1}$, $\lambda_{V2}$, and/or $\lambda_{V3}$.

Likewise, in embodiments, excitation wavelength range $\lambda_{I4}$ may be either separated, contiguous, and/or overlapping with excitation wavelength ranges $\lambda_{I1}$, $\lambda_{I2}$, and/or $\lambda_{I3}$.

Figure 12:
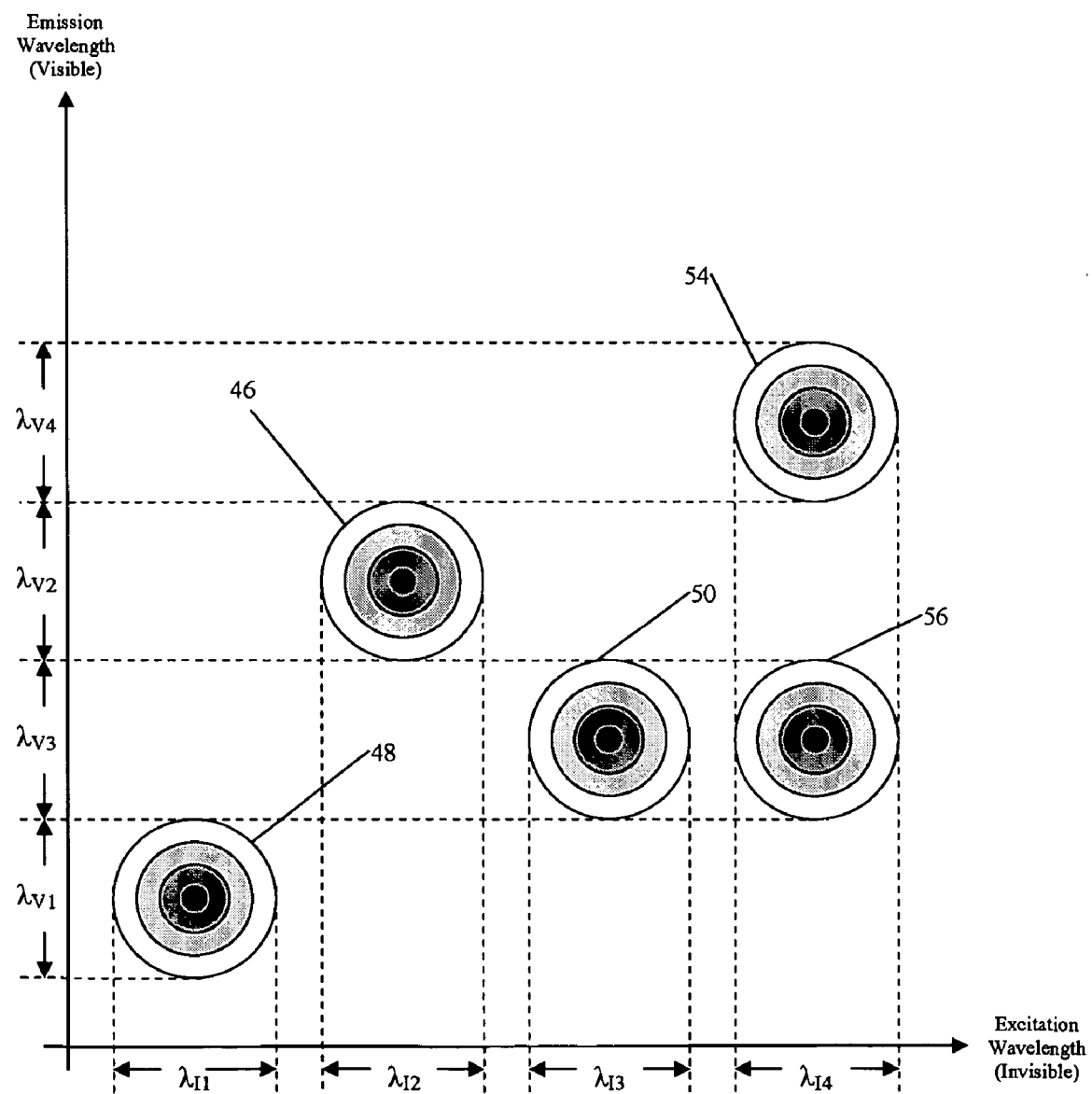

FIG. 12 is an example diagram illustrating regions 54 and 56 in addition to regions 48, 46, and 50, in accordance with embodiments. Example regions 54 and 56 are illustrated as being in the same excitation wavelength range $\lambda_{I4}$, but having different emission wavelength ranges. For example, region 54 is in the emission wavelength range of $\lambda_{V4}$ and region 56 is in the emission wavelength range of $\lambda_{V3}$. Accordingly, a non-primary color (e.g. the combination of visible wavelength ranges $\lambda_{V3}$ and $\lambda_{V4}$) may be emitted in response to a single excitation light range (e.g. $\lambda_{I4}$). Use of more than one type of light emitting material, which is responsive to the same range of emission light, may be used for a non-primary color which is regularly displayed or requires accurate wavelength combination emission. In embodiments, the ratio of amount of light emitting particles associated with region 58 and region 60 can be adjusted so that visible emission from these light emitting particles (in response to excitation light in the wavelength range $\lambda_{I4}$) can be a predetermined non-primary color. Accordingly, using excitation light in the range of $\lambda_{I4}$, a non-primary color can be emitted without the necessity of two ranges of excitation light, which may need to have different intensities.

Figure 13:
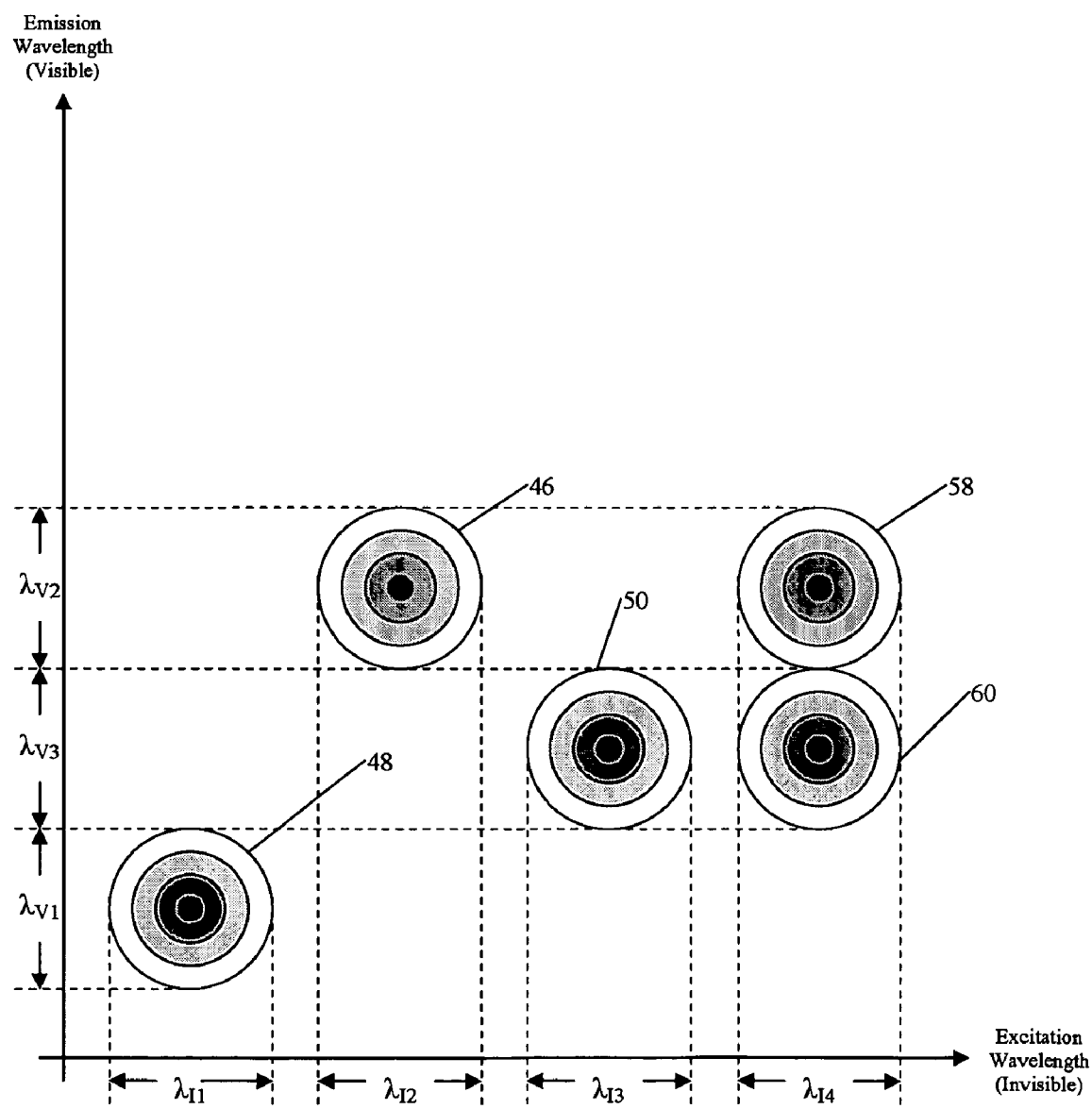

FIG. 13 is an example diagram illustrating regions 58 and 60 in addition to regions 48, 46, and 50, in accordance with embodiments. Example regions 58 and 60 are illustrated as being in the same excitation wavelength range $\lambda_{I4}$, but having different emission wavelength ranges. Region 58 shares the emission wavelength range $\lambda_{V2}$ with region 46. Region 60 shares the emission wavelength range $\lambda_{V3}$ with region 50.

Figure 14:
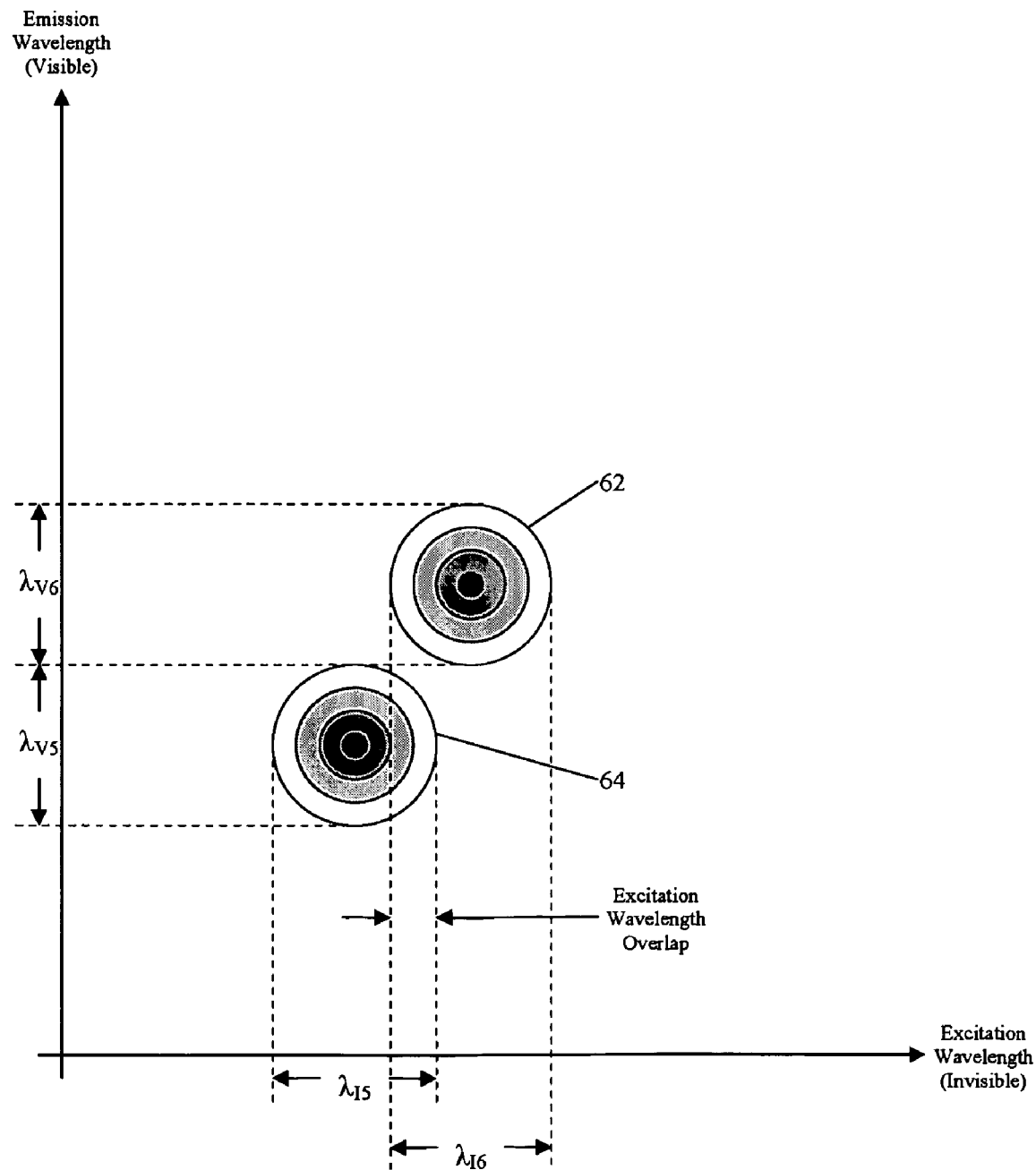

FIG. 14 is an example diagram illustrating regions 62 and 64, which have partially overlapping excitation wavelength ranges. Accordingly, when the excitation wavelength range $\lambda_{I6}$ is absorbed, light is emitted from both the $\lambda_{V6}$ and the $\lambda_{V5}$ wavelength ranges. However, because region 64 only partially intersects with the excitation wavelength range $\lambda_{I6}$ while region 62 fully intersects with the excitation wavelength range $\lambda_{I6}$, the intensity in the emission in wavelength range $\lambda_{V6}$ will be less than the emission in the wavelength range $\lambda_{V5}$. Likewise, when the excitation wavelength range $\lambda_{I5}$ is absorbed, light is emitted from both the $\lambda_{V6}$ and the $\lambda_{V5}$ wavelength ranges in different intensities. In embodiments, excitation wavelength ranges which are parts of excitation wavelength ranges $\lambda_{I6}$ and/or $\lambda_{I5}$ can be absorbed to get a calculated balance of color that includes wavelengths in both the $\lambda_{V6}$ and the $\lambda_{V5}$ wavelength ranges at appropriate intensities. For the purposes of illustration, only two regions (i.e. regions 66 and 68) are illustrated; however, other combinations of regions can also be included.

Figure 15:
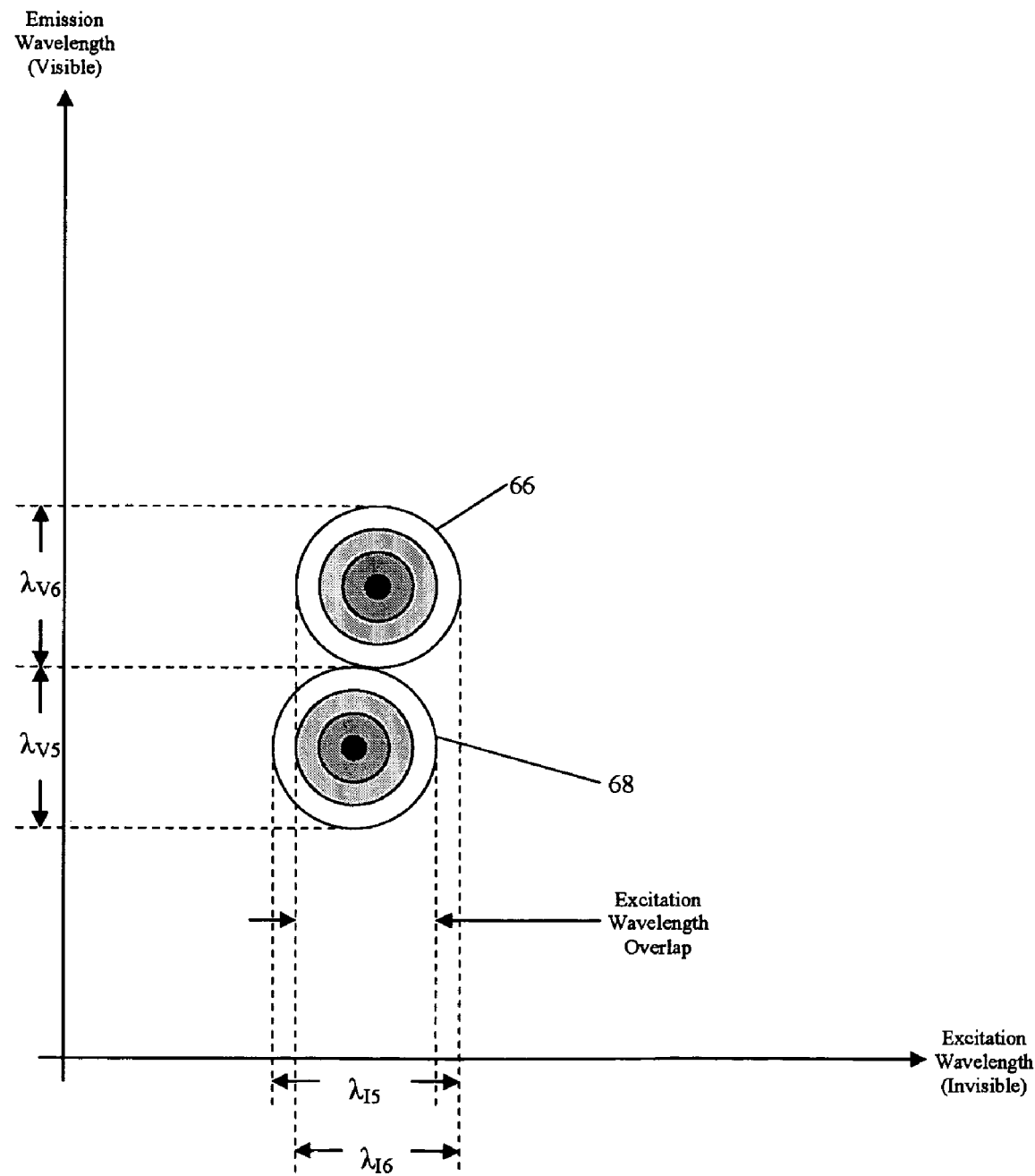

FIG. 15 is an example diagram illustrating regions 66 and 68, which substantially overlap, in accordance with embodiments. Similar to the embodiments illustrated in FIG. 14, primary colors can be combined depending on excitation wavelengths. However, in embodiments, regions 66 and 68 can have substantially the same effect as being completely overlapped, like regions 58 and 60 in example FIG. 7.

Figure 16:
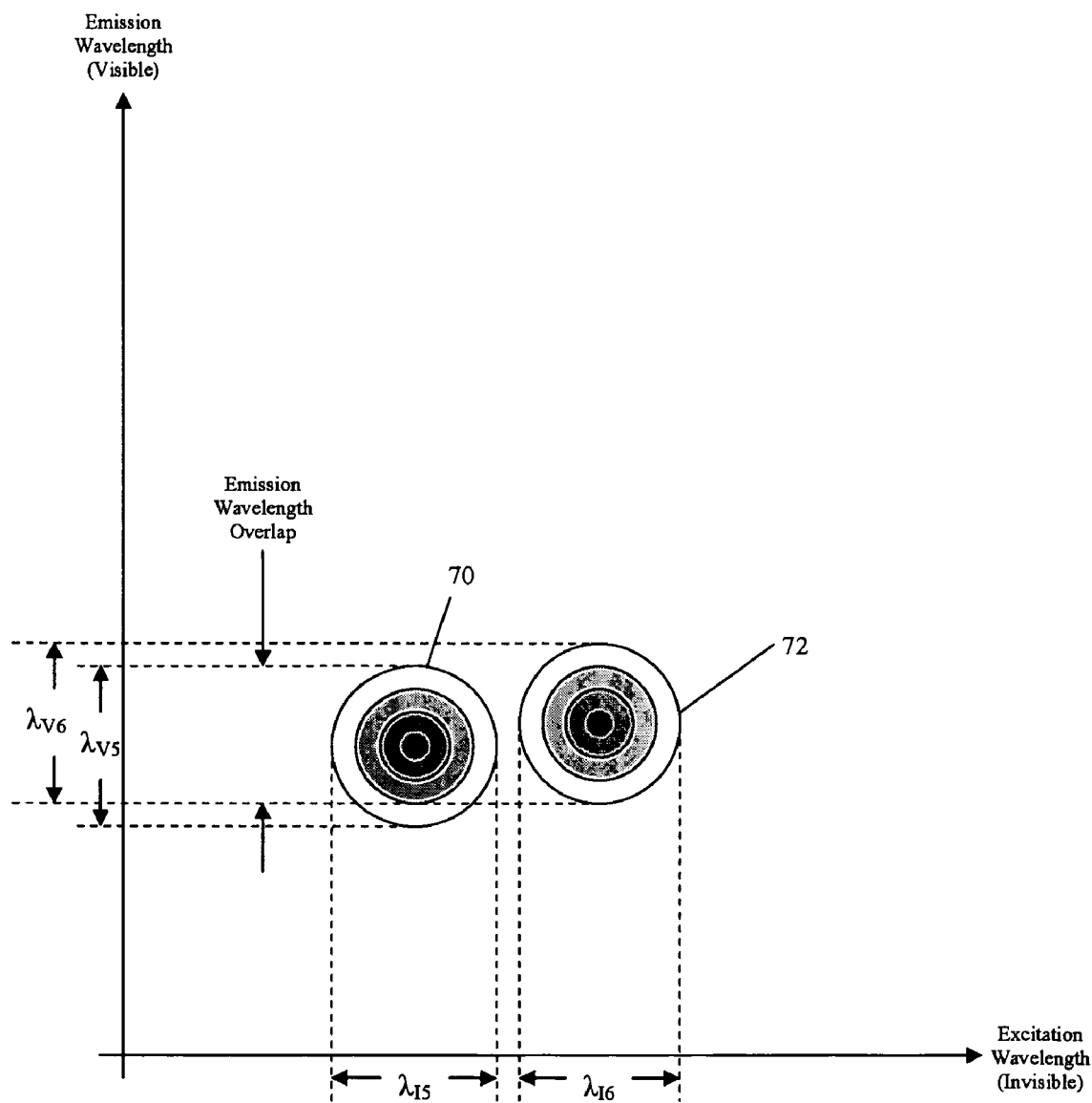
Figure 17:
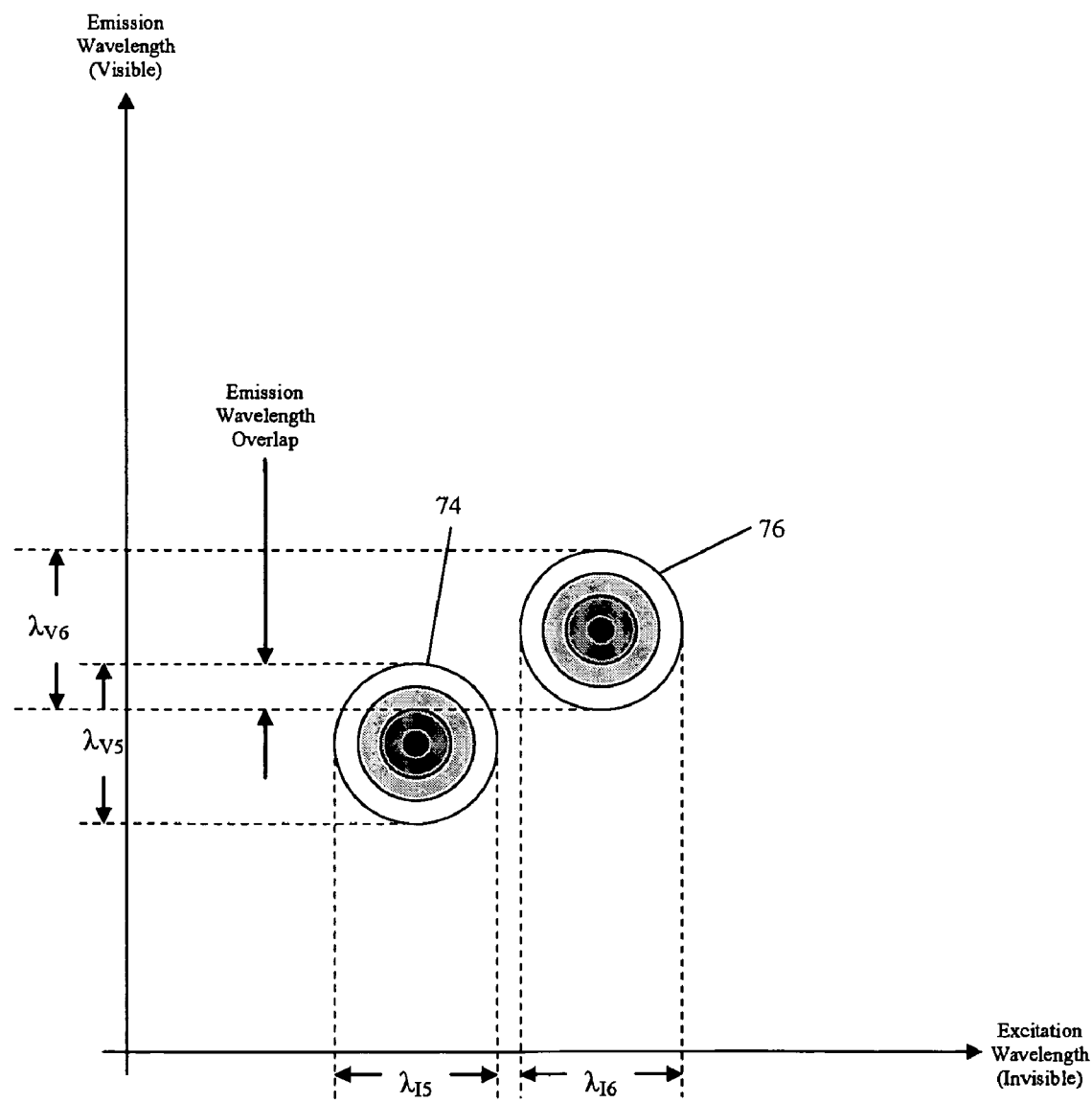

Example FIGS. 16 and 17 are similar to the embodiments illustrated in example FIGS. 15 and 14, respectively. However, instead of the overlap of the excitation wavelength ranges in FIGS. 16 and 17, there is overlap in the emission wavelength ranges. In example FIG. 16, there is substantial overlap of regions 70 and 72 in the emission wavelength ranges $\lambda_{V6}$ and the $\lambda_{V5}$. In example FIG. 17, there is partial overlap of regions 74 and 76 in the emission wavelength ranges $\lambda_{V6}$ and the $\lambda_{V5}$.

Embodiments relate to an apparatus comprising light emitting material integrated into a substantially transparent substrate. The light emitting material is configured to emit visible light in response to absorption of excitation light. The wavelength of the visible light varies according to the wavelength of the excitation light. The light emitting material may comprise a plurality of different materials and each of the plurality of different materials may emit a different range of wavelengths of visible light. Each of the plurality of different materials may emit visible light in response to absorption of a different range of wavelengths of excitation light. The plurality of different materials may be integrated into the substantially transparent substrate in different regions. The regions may be pixels. The regions may be stripes. The plurality of different materials may be integrated into the substantially transparent substrate in layers. Each layer of the layers may comprise a different material of the plurality of different materials. The plurality of different materials may be integrated into the substantially transparent substrate as a mixture. The plurality of different materials may be integrated into the substantially transparent substrate by being coated onto the substantially transparent substrate. The plurality of different materials may be integrated into the substantially transparent substrate by be dispersed into the substantially transparent substrate. The plurality of different materials may comprise Europium and emit red light. The plurality of different materials may comprise Terbium and emits green light. The plurality of different materials may comprise Cerium and emit at least one of blue light and yellow light. The plurality of different materials may comprise Erbium and emit blue light. The plurality of different materials may comprise an organic fluorescent dye and emit blue light. The plurality of different materials may comprise a first type of material configured to emit visible light having a first color and a second type of material configured to emit visible light having a second color. The first type of material may emit visible light having a first color in response to a first wavelength range of excitation light and the second type of material may emit visible light having a second color in response to a second wavelength range of excitation light. The first wavelength range and the second wavelength range may partially overlap. The first wavelength range may completely overlap the second wavelength range. The first wavelength range may substantially overlap the second wavelength range. The first wavelength range of excitation light and the second wavelength range of excitation light may be emitted from at least one light source. The at least one light source may be at least one projector. The at least one projector may be a digital micro mirror device projector. The at least one light source may be at least one laser. The at least one light source may be a single light source. At least one of the first color and the second color may be a primary color. At least one of the first color and the second color may be a non-primary color. The plurality of different materials may comprise a third type of material configured to emit visible light having a third color, wherein the first color is red, the second color is blue; and the third color is green. The plurality of different materials may comprise a fourth type of material configured to emit visible light having a fourth color. The light emitting material may comprise a plurality of light emitting particles. Each of the plurality of light emitting particles may have a diameter less than about 500 nanometers. Each of the plurality of light emitting particles may have a diameter less than about 400 nanometers. Each of the plurality of light emitting particles may have a diameter less than about 300 nanometers. Each of the plurality of light emitting particles may have a diameter less than about 200 nanometers. Each of the plurality of light emitting particles may have a diameter less than about 100 nanometers. Each of the plurality of light emitting particles may have a diameter less than about 50 nanometers. Each of the plurality of light emitting particles may be an individual molecule. Each of the plurality of light emitting particles may be an individual atom.

Embodiments relate to a method comprising integrating light emitting material into a substantially transparent substrate. The light emitting material is configured to emit visible light in response to absorption of excitation light. The wavelength of the visible light varies according to the wavelength of the excitation light.

Embodiments relate to a method comprising emitting visible light from light emitting material in response to absorption of excitation light. The light emitting material is integrated into a substantially transparent substrate. The wavelength of the visible light varies according to the wavelength of the excitation light.

The foregoing embodiments (e.g. light emitting material integrated into a substantially transparent substrate) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising light emitting material integrated into a substantially transparent substrate, wherein:
the light emitting material is configured to emit visible light in response to absorption of excitation light;
the wavelength of the visible light varies according to the wavelength of the excitation light;
the light emitting material comprises a plurality of light emitting particles; and
each of the plurality of light emitting particles has a diameter less than about 500 nanometers.

2. The apparatus of claim 1, wherein:
the light emitting material comprises a plurality of different materials; and
each of the plurality of different materials emits a different range of wavelengths of visible light.

3. The apparatus of claim 2, wherein:
each of the plurality of different materials emits visible light in response to absorption of a different range of wavelengths of excitation light.

4. The apparatus of claim 2, wherein the plurality of different materials are integrated into the substantially transparent substrate in different regions.

5. The apparatus of claim 4, wherein the regions are pixels.

6. The apparatus of claim 4, wherein the regions are stripes.

7. The apparatus of claim 2, wherein the plurality of different materials are integrated into the substantially transparent substrate in layers.

8. The apparatus of claim 7, wherein each layer of the layers comprises a different material of the plurality of different materials.

9. The apparatus of claim 2, wherein the plurality of different materials are integrated into the substantially transparent substrate as a mixture.

10. The apparatus of claim 2, wherein the plurality of different materials are integrated into the substantially transparent substrate by being coated onto the substantially transparent substrate.

11. The apparatus of claim 2, wherein the plurality of different materials are integrated into the substantially transparent substrate by be dispersed into the substantially transparent substrate.

12. The apparatus of claim 2, wherein the plurality of different materials which comprise Europium which emits red light.

13. The apparatus of claim 2, wherein the plurality of different materials which comprise Terbium which emits green light.

14. The apparatus of claim 2, wherein the plurality of different materials which comprise Cerium which emits at least one of blue light and yellow light.

15. The apparatus of claim 2, wherein the plurality of different materials which comprise Erbium which emits green light.

16. The apparatus of claim 2, wherein the plurality of different materials which comprises at least one organic fluorescent dye and organic pigment.

17. The apparatus of claim 16, wherein said at least one organic dye and organic pigment is at least one organo-metalic dye and organo-metalic pigment.

18. The apparatus of claim 2, wherein the plurality of different materials comprises:
   a first type of material configured to emit visible light having a first color; and
   a second type of material configured to emit visible light having a second color.

19. The apparatus of claim 18, wherein:
   the first type of material emits visible light having a first color in response to a first wavelength range of excitation light; and
   the second type of material emits visible light having a second color in response to a second wavelength range of excitation light.

20. The apparatus of claim 19, wherein first wavelength range and the second wavelength range partially overlap.

21. The apparatus of claim 19, wherein the first wavelength range completely overlaps the second wavelength range.

22. The apparatus of claim 19, wherein the first wavelength range substantially overlaps the second wavelength range.

23. The apparatus of claim 19, wherein the first wavelength range of excitation light and the second wavelength range of excitation light are emitted from at least one light source.

24. The apparatus of claim 23, wherein the at least one light source is at least one projector.

25. The apparatus of claim 24, wherein the at least one projector is a digital micro mirror device projector.

26. The apparatus of claim 23, wherein the at least one light source is at least one laser.

27. The apparatus of claim 23, wherein the at least one light source is a single discharge light source.

28. The apparatus of claim 18, wherein at least one of the first color and the second color is a primary color.

29. The apparatus of claim 18, wherein at least one of the first color and the second color is a non-primary color.

30. The apparatus of claim 18, wherein:
   the plurality of different materials comprises a third type of material configured to emit visible light having a third color;
   the first color is red;
   the second color is blue; and
   the third color is green.

31. The apparatus of claim 30, wherein the plurality of different materials comprises a fourth type of material configured to emit visible light having a fourth color.

32. The apparatus of claim 1, wherein each of the plurality of light emitting particles has a diameter less than about 400 nanometers.

33. The apparatus of claim 32, wherein each of the plurality of light emitting particles has a diameter less than about 300 nanometers.

34. The apparatus of claim 33, wherein each of the plurality of light emitting particles has a diameter less than about 200 nanometers.

35. The apparatus of claim 34, wherein each of the plurality of light emitting particles has a diameter less than about 100 nanometers.

36. The apparatus of claim 35, wherein each of the plurality of light emitting particles has a diameter less than about 50 nanometers.

37. The apparatus of claim 1, wherein each of the plurality of light emitting particles is an individual molecule.

38. The apparatus of claim 1, wherein each of the plurality of light emitting particles is an individual atom.

39. A method comprising integrating light emitting material into a substantially transparent substrate, wherein:
   the light emitting material is configured to emit visible light in response to absorption of excitation light;
   the wavelength of the visible light varies according to the wavelength of the excitation light;
   the light emitting material comprises a plurality of light emitting particles; and
   each of the plurality of light emitting particles has a diameter less than about 500 nanometers.

40. A method comprising emitting visible light from light emitting material in response to absorption of excitation light, wherein:
   the light emitting material is integrated into a substantially transparent substrate;
   the wavelength of the visible light varies according to the wavelength of the excitation light;
   the light emitting material comprises a plurality of light emitting particles; and
   each of the plurality of light emitting particles has a diameter less than about 500 nanometers.

* * * * *